Figure 1:
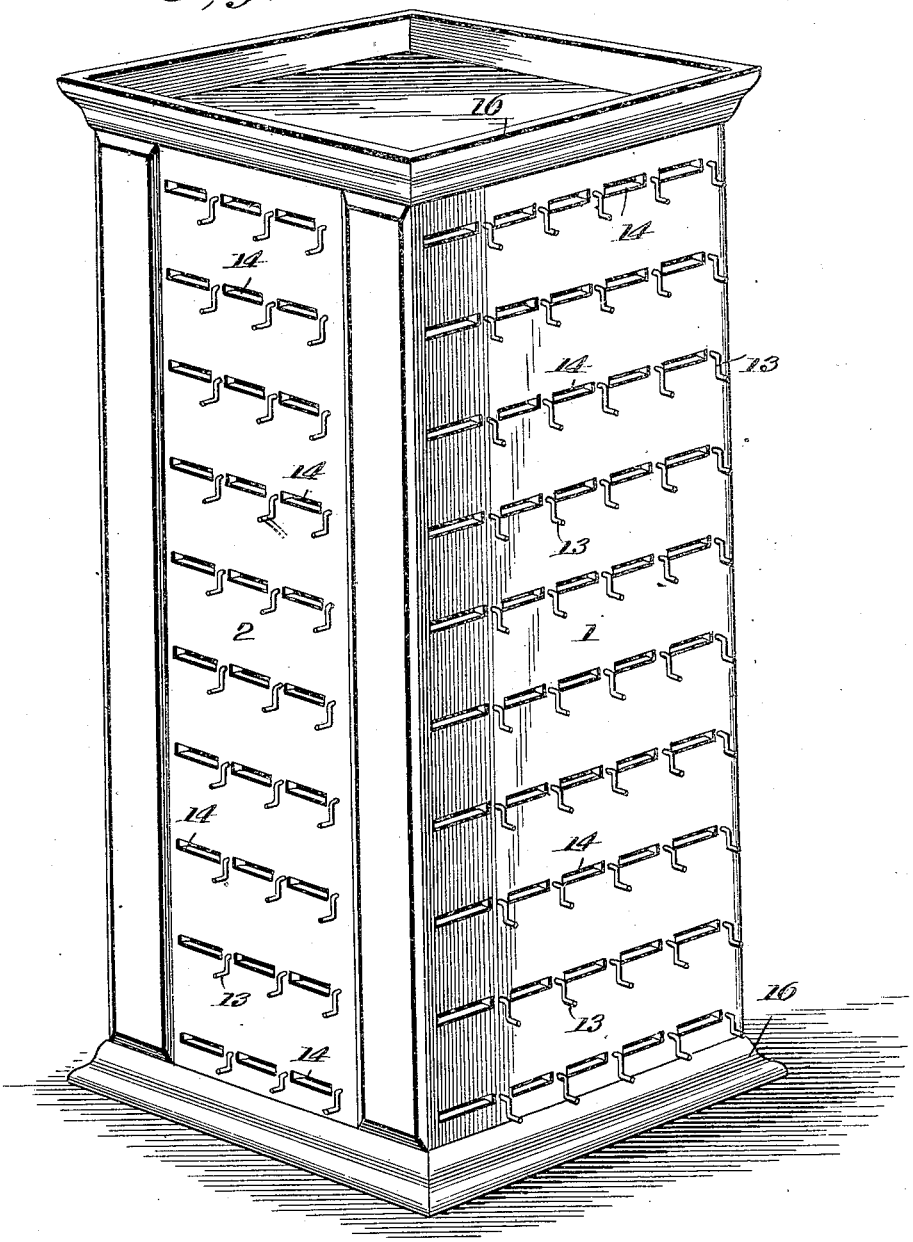

F. A. HAYDEN.
CABINET.
APPLICATION FILED AUG. 12, 1908.

921,543.

Patented May 11, 1909.
2 SHEETS—SHEET 1.

WITNESSES
F. C. Barry
C. E. Trainor

INVENTOR
FRANK A. HAYDEN
BY Munn & Co.
ATTORNEYS

F. A. HAYDEN.
CABINET.
APPLICATION FILED AUG. 12, 1908.
921,543.
Patented May 11, 1909.
2 SHEETS—SHEET 2.
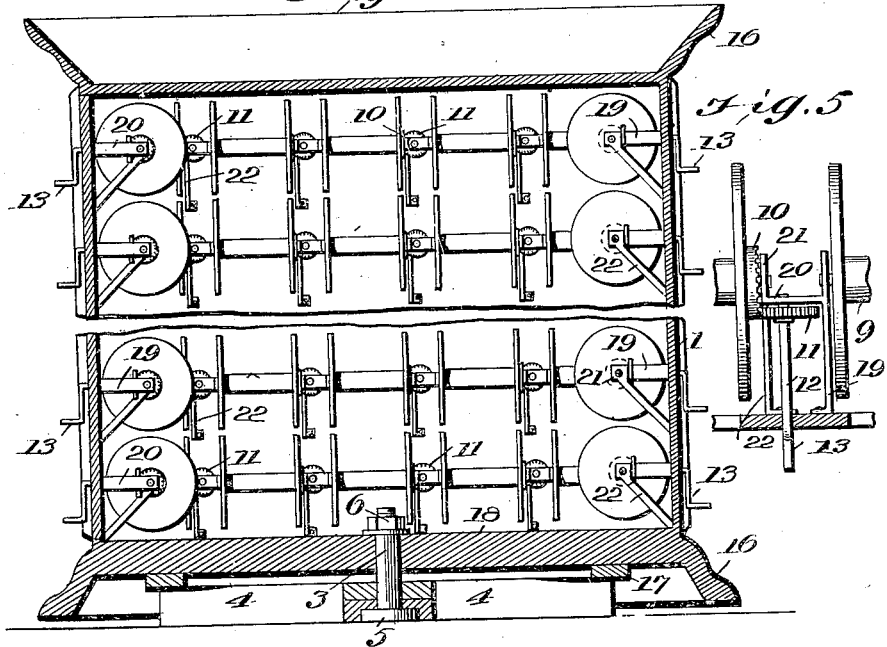
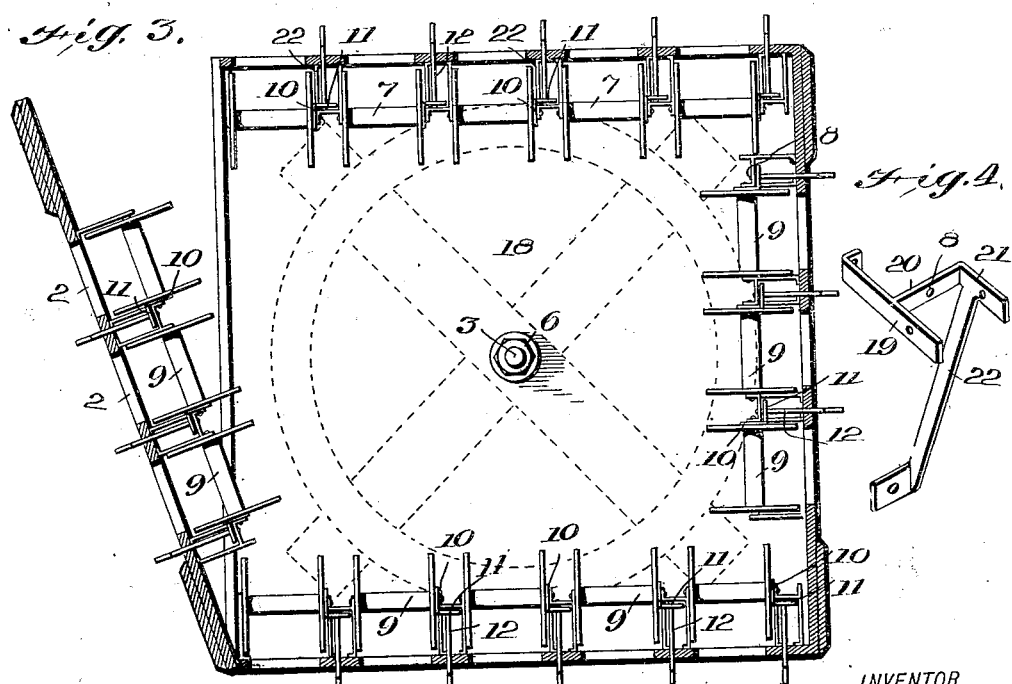
WITNESSES
F. C. Barry
C. E. Trainor
INVENTOR
FRANK A. HAYDEN
BY Munn & Co.
ATTORNEYS

UNITED STATES PATENT OFFICE.

FRANK A. HAYDEN, OF PILOT POINT, TEXAS.

CABINET.

No. 921,543.   Specification of Letters Patent.   Patented May 11, 1909.

Application filed August 12, 1908. Serial No. 448,093.

*To all whom it may concern:*

Be it known that I, FRANK A. HAYDEN, a citizen of the United States, and a resident of Pilot Point, in the county of Denton and State of Texas, have invented certain new and useful Improvements in Cabinets, of which the following is a specification.

My invention is an improvement in cabinets, and consists in certain novel constructions and combinations of parts hereinafter described and claimed.

Referring to the drawings forming a part hereof Figure 1 is a perspective view of the cabinet. Fig. 2 is a central longitudinal section. Fig. 3 is a horizontal section. Fig. 4 is a detail perspective view of one of the brackets, and Fig. 5 is an enlarged detail of the connection between the reels and the operating mechanism.

The present embodiment of the invention comprises a hollow casing 1, substantially rectangular in cross section, one of the sides 2 thereof being adapted to open as a door as shown in Fig. 3, and the casing is rotatably mounted on a pin 3 journaled in a bearing 4, the pin being provided at its lower end with a head 5, and threaded at its upper end, the upper end being engaged by a nut 6. A plurality of shafts 7, are journaled horizontally in the casing, in spaced relation, and adjacent to each side thereof, the shafts being arranged one above the other as shown in Fig. 2, and journaled in suitable bearings 8. Upon the shafts, at suitable intervals and in spaced relation are journaled reels 9, each being provided at one end with a gear 10, which is engaged by a gear 11 on a short shaft 12, journaled in the casing, and having a crank 13 projecting outside of the casing. A slit 14 is provided in the wall of the casing on a level with each reel, the slit being directly in front of the reel as shown in Fig. 3, and of a length equal to the width of the reel. The top 15 and the bottom 16 of the casing may be provided with a suitable molding and the said bottom turns on a circular ring 17, secured on the ends of a cross 18 through which the pin 3 before described passes.

It will be observed that the shafts on two of the opposite sides as shown in Fig. 3, are shorter than the shafts on the other sides, so that the reels on said first named sides may fit between the ends of the shafts on the other sides. The cabinet is especially adapted for containing lace, ribbons, or other like narrow goods wound in rolls, and the ends of the lace, or ribbon are adapted to be passed out through the slits. When it is desired to withdraw the lace or ribbon, the end of the same is taken hold of. The reel corresponding thereto rotates, thus permitting the lace or ribbon to be withdrawn. By rotating the crank of the reel, the reel may be rotated to rewind the lace or ribbon thereon.

The shafts are supported by the bracket shown in Fig. 4, each comprising a plate 19 adapted to be secured to the wheel of the casing, and having a central outwardly projecting arm 20 provided with a lateral portion 21, which is connected by a brace 22 with the wall of the cabinet. The portion 20 is provided with a bearing 23 in which the shaft 7 is journaled.

By providing the door 2 in the casing, access may be had to the interior thereof, and the central portion of the casing not occupied by the reels may be used as a storage place.

I claim:

A cabinet comprising a casing provided on its side walls with a plurality of horizontal series of alined slots, a pair of brackets secured to the inner wall of the casing at each slot, the members of the pair being arranged one at each end of the slot, a reel journaled between each pair of brackets, a cross piece connecting the brackets between the reels, a shaft journaled in the side wall of the casing and in the cross piece adjacent to each reel, a pinion on the inner end of the shaft, and a crown wheel on the reel with which the pinion meshes, the outer end of the shaft being provided with a gearing for the purpose set forth.

FRANK A. HAYDEN.

Witnesses:
 JOHN H. DRYDEN,
 GREEN FLAKE.